US010865921B2

United States Patent
Grouillet et al.

(10) Patent No.: US 10,865,921 B2
(45) Date of Patent: Dec. 15, 2020

(54) DEVICE FOR COUPLING A RIGID MALE ENDPIECE TO A FLEXIBLE FEMALE PIPE, AND PRODUCTION METHOD THEREFOR

(71) Applicant: HUTCHINSON, Paris (FR)

(72) Inventors: Philippe Grouillet, Conflans sur Loing (FR); Denis Godeau, Vieilles Maisons (FR)

(73) Assignee: HUTCHINSON, Paris (FR)

( * ) Notice: Subject to any disclaimer, the term of this patent is extended or adjusted under 35 U.S.C. 154(b) by 668 days.

(21) Appl. No.: 15/524,022

(22) PCT Filed: Nov. 5, 2014

(86) PCT No.: PCT/FR2014/052821
§ 371 (c)(1),
(2) Date: Oct. 4, 2017

(87) PCT Pub. No.: WO2016/071582
PCT Pub. Date: May 12, 2016

(65) Prior Publication Data
US 2018/0017195 A1    Jan. 18, 2018

(51) Int. Cl.
*F16L 33/22*         (2006.01)
*F16L 33/213*        (2006.01)
(Continued)

(52) U.S. Cl.
CPC .......... *F16L 33/227* (2013.01); *B29C 65/568* (2013.01); *B29C 66/12441* (2013.01);
(Continued)

(58) Field of Classification Search
CPC ..... F16L 33/227; F16L 13/032; F16L 33/213; F16L 37/088; F16L 37/144; F16L 47/24;
(Continued)

(56) References Cited

U.S. PATENT DOCUMENTS 4,929,002 A * 5/1990 Sauer .................... F16L 33/213
285/148.13
5,209,527 A * 5/1993 Hohmann ............... F16L 33/20
285/242
(Continued)

FOREIGN PATENT DOCUMENTS

DE     102004016597 A1    10/2005
EP        0621432 A1      10/1994
(Continued)

*Primary Examiner* — Matthew Troutman
*Assistant Examiner* — William S. Choi
(74) *Attorney, Agent, or Firm* — Browdy & Neimark, PLLC

(57) ABSTRACT

A fluid-transfer coupling device designed to couple a rigid male endpiece to a flexible female pipe and to the production method therefor. The device includes a sleeve for gripping around the pipe and locking the endpiece, the sleeve having a radially inner part surrounding an annular sealing lining mounted in abutment on the endpiece; and a metal socket having a tubular portion gripped by the pipe and ending in a collar formed by a radial step which extends in an axial end and has a radial height, the axial end being mounted inside and in contact with the radially inner part and forming the base of a groove receiving the lining, the device comprising means for fitting the sleeve to the collar and comprising a continuous peripheral projection formed in one piece with the sleeve. According to the invention the projection projects radially in abutment against the step aver most of the radial height.

18 Claims, 3 Drawing Sheets

(51) Int. Cl.
*F16L 37/088* (2006.01)
*F16L 47/24* (2006.01)
*F16L 17/03* (2006.01)
*B29C 65/00* (2006.01)
*B29C 65/56* (2006.01)
*F16L 37/14* (2006.01)
*B29L 31/24* (2006.01)

(52) U.S. Cl.
CPC ........ *B29C 66/5344* (2013.01); *B29C 66/612* (2013.01); *B29C 66/7392* (2013.01); *B29C 66/742* (2013.01); *F16L 17/032* (2013.01); *F16L 33/213* (2013.01); *F16L 37/088* (2013.01); *F16L 37/144* (2013.01); *F16L 47/24* (2013.01); *B29C 66/71* (2013.01); *B29C 66/721* (2013.01); *B29L 2031/24* (2013.01)

(58) Field of Classification Search
CPC ......... F16L 17/02; F16L 37/122; F16L 33/20; F16L 33/18; F16L 33/02; F16L 33/025; F16L 33/207; F16L 31/00; F16L 33/2076

USPC ...... 285/288.1, 54, 344, 374, 377, 399, 400, 285/256, 305, 382, 382.1, 387, 238
See application file for complete search history.

(56) References Cited

U.S. PATENT DOCUMENTS

| | | |
|---|---|---|
| 5,226,680 A | 7/1993 | Bahner et al. |
| 6,308,993 B1* | 10/2001 | Phillips ............... F16L 33/2071 285/256 |
| 2003/0038478 A1* | 2/2003 | Humphreys .......... F16L 33/227 285/256 |

FOREIGN PATENT DOCUMENTS

| | | |
|---|---|---|
| EP | 2042795 A1 | 4/2009 |
| FR | 1455542 | 4/1966 |

* cited by examiner

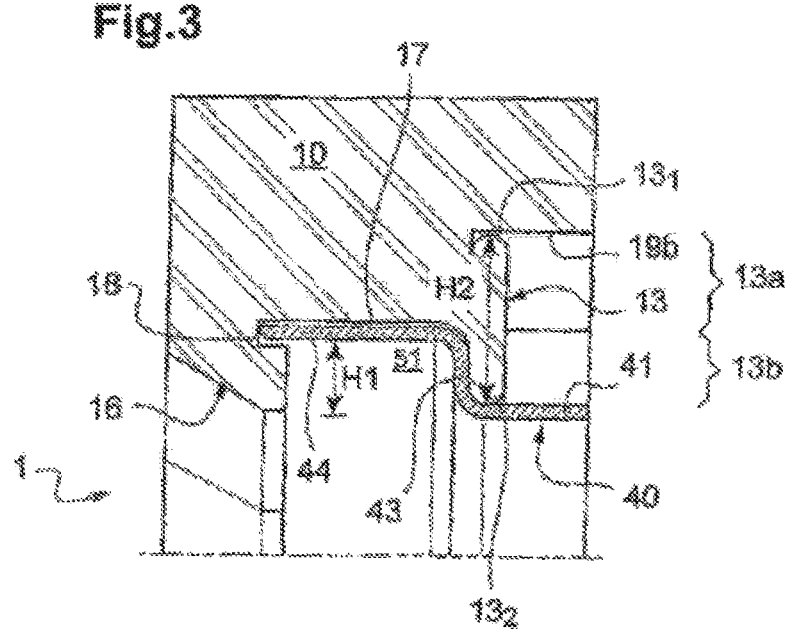
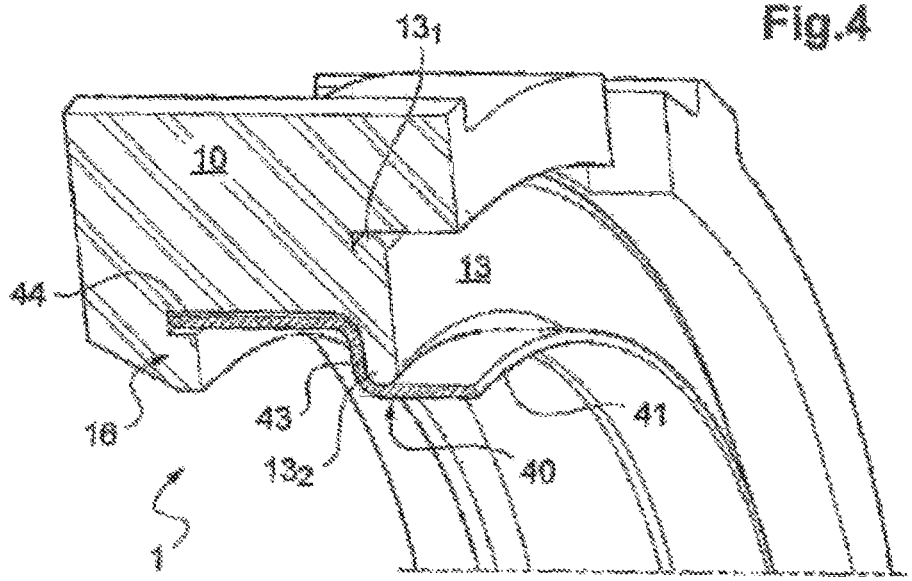

DEVICE FOR COUPLING A RIGID MALE ENDPIECE TO A FLEXIBLE FEMALE PIPE, AND PRODUCTION METHOD THEREFOR

FIELD

The present invention relates to a fluid transfer coupling device suitable for coupling a rigid male endpiece to a flexible female pipe, for example made from elastomer, and a method for producing this device. The invention in particular applies to quick couplers in the automobile field, including vehicles moved by an internal combustion engine of the passenger, utility, truck, construction (e.g., civil engineering), or even agricultural type, and in the field of fixed installations (e.g., power generators, compressors, pumps) using a similar combustion engine. For these two groups of applications, the device according to the invention can in particular equip a pollution control, cooling, or advantageously, air supply circuit.

BACKGROUND

In general in a fluid transfer circuit for a motor vehicle, it is known, to sealably connect a flexible pipe to a locking rigid male endpiece, to use a coupling device comprising a polymeric connector body whereof one end receives the male endpiece, around which the pipe is fitted. The device further comprises a metal collar to secure the gripping of the pipe on the connector body. One major drawback of this coupling device lies in the risk of alteration of the pipe by the collar during operation and a large bulk of the device.

It is also known to produce the entire connector body from a shaped metal material and to fasten the pipe thereto by local deformation of a cylindrical socket, which has the drawbacks of requiring a complex shaping method of the body, resulting in high tooling and production costs, and having a lack of adaptability of the device (with insertion in a closed groove of a sealing lining that must be provided with no framework).

Document U.S. Pat. No. 5,226,680 teaches connecting a rigid male endpiece to a flexible pipe using a plastic sleeve assembled to a metal socket flared at an end collar of the socket that receives a sealing lining and is defined by a radial step extending at a right angle by an axial end of the collar. The sleeve is assembled to the collar via a single radial circumferential extension of the sleeve formed by a short continuous bead mounted abutting against the origin of the axial end of the socket on the one hand, and an annular radial portion of the sleeve that grips the free end of this axial end, on the other hand. The pipe is thus gripped between the sleeve and the socket axially away from this step, with the use of a plastic locking member ending with three radial protrusions respectively mounted abutting against three arms of the sleeve gripping a circumferential protrusion of the male endpiece.

One major drawback of this coupling device lies in the complex and bulky structure of the sleeve and its assembly to the socket on both the rear and front sides of its collar, respectively by said radial extension and by said radial portion of the sleeve.

French Patent Application FR 1,455,542, filed on Jun. 17, 2014 in the Applicant's name, describes a device for coupling a protruding male coupling endpiece to a female pipe, comprising:

a sleeve gripping the pipe and locking the protrusion by a locking member, the sleeve having a radially inner part surrounding a sealing lining mounted on the endpiece,
a socket with a tubular portion gripped by the pipe and ending with a collar formed by a radial step which extends in an axial end mounted inside and in contact with the radially inner part and forming a bottom of an annular groove receiving the lining, and
means for mechanically assembling the sleeve to the collar that comprise discontinuous stops that may or may not be secured to the sleeve and extending substantially radially across from the step.

One aim of the present invention is to propose a new fluid transfer coupling device, for example snapping, suitable for coupling a rigid male endpiece having a circumferential coupling protrusion to a flexible female pipe, which resolves the aforementioned drawbacks and comprises:

a sleeve suitable for gripping the pipe and axially locking the endpiece by a locking member with which the sleeve is provided and that cooperates with said protrusion, the sleeve having a radially inner part intended to surround an annular sealing lining mounted bearing on the endpiece, and
a socket comprising a tubular portion intended to be gripped by the pipe and ending with a collar comprising a radial step that extends by an axial end of the socket and that has a radial step height, said axial end being mounted radially inside and in contact with said radially inner part and forming a bottom of an annular groove suitable for receiving the lining,
the device comprising assembly means that are suitable for mechanically assembling the sleeve to said collar and that comprise a continuous circumferential protuberance formed in a single piece with the sleeve.

To that end, a device according to the invention is such that said protuberance extends protruding bearing radially against said step, over a majority of said radial step height.

It will be noted that the invention thus makes it possible to obtain a mechanical assembly with a simple, robust structure that is lastingly sealed between an injection-moldable polymeric sleeve (therefore using precise, reproducible and varied shapes) around a deformed metal socket with a variable shape (i.e., interchangeable), provided that it defines a groove for the sealing lining in contact with which these assembly means are mounted abutting, while respecting the integrity of the pipe and procuring a reduced bulk compared to the device of document U.S. Pat. No. 5,226, 680.

It will also be noted that said radial protuberance according to the invention mounted against the majority of the step of the socket can be formed simply by hot plastic deformation, as described below, therefore with a lower manufacturing cost.

It will further be noted that the sealing lining housed in the groove defined both by the sleeve and the collar of the socket can be any seal, for example with a rigid framework, and that the locking member used can be any metal pin. As a result of this interchangeability between sockets, locking members and sealing linings, a coupling device according to the invention can be produced with a reduced investment in tooling and therefore also a reduced cost, independently of the socket, the lining and the locking member to be used.

The or at least one of the polymers usable to form the sleeve, or at least a plastic matrix for a composite sleeve, can be all thermoplastic polymers, such as PBT (polybutylene terephthalate), a polyamide (e.g., PA 6, PA 6.6, PA 4.6) or a blend of several of these polymers, non-limitingly.

The socket can be made from a stainless steel, a steel with or without surface treatment, or an alloy of metals for example comprising aluminum, non-limitingly.

In general:

the sleeve can be injection molded from a plastic or composite material with a plastic matrix and have a radially inner face on which at least one circumferential bead is molded across from said tubular portion of the socket that is made from metal, said at least one bead being suitable for cooperating with a radially outer face, preferably corrugated, of said pipe, this or these bead(s) advantageously forming a series of corrugations for the sleeve making it possible to improve the overall holding power of the pipe; and said tubular portion of the socket can have at least one circumferential bulge obtained by rolling and suitable for cooperating with an inner face of said pipe intended to be gripped by the sleeve.

The flexible pipe can be made from an elastomer material chosen from among rubbers and thermoplastic elastomers (TPE).

According to another general aspect of the invention, the device can incorporate said sealing lining, which is housed in said groove and which comprises at least one seal, for example an O-ring or a lip seal.

According to another feature of the invention, said protuberance can extend in a manner radially elongated inward from said radially inner part of the sleeve, over substantially all of said radial step height.

Advantageously, said protuberance can extend over all of said radial step height and have, in axial section, an oblong or profiled geometry that is radially elongated and that ends with a radially inner rim bearing against said tubular portion of the socket.

It will be noted that this radially elongated shape of the protuberance gives it an axially flattened geometry, which is thus circumferentially higher than it is wide in the respective radial and axial directions, preferably being at least two times, and for example at least four times, taller than it is wide.

Still more advantageously, said axial geometry:

if it is oblong, can be substantially in the shape of a truncated rectangle that has two radial large sides and two axial and rounded small sides ("truncated rectangle" here means that the large side of the protuberance is connected with the rest of the sleeve, which is only partially visible), and if it is profiled, can have an axial width that decreases radially inward over said radial step height, said protuberance having a convex outer contour with an axial section substantially in the shape of an arc of circle.

According to another feature of the invention, said protuberance may comprise:

a radially outer portion extending radially toward the outside of said axial end of the socket up to a radially outer edge of said protuberance, and a radially inner portion extending radially toward the inside of said axial end of the socket up to a radially inner edge of said protuberance.

According to another feature of the invention, the sleeve may have a radially outer part that is situated across from said tubular portion of the socket and that is intended to surround said pipe, said protuberance being able to extend protruding radially outward up to said radially outer edge, which is substantially mounted in contact with said radially outer part.

Advantageously, said radially inner edge and said radially outer edge of said protuberance can have a convex shape.

According to another feature of the invention, the sleeve can advantageously have a base of a plastic or a composite material with a plastic matrix that is injection molded, and said protuberance can be obtained by hot plastic deformation of an axial annular protrusion that said radially inner part of the sleeve initially has in place of said protuberance, across from said tubular portion of the socket.

Advantageously, said radial step of the socket can be connected to said axial end of this step by a first rounded transition and/or to said tubular portion by a second rounded transition.

According to another feature of the invention, said radially inner part of the sleeve can have an axial circumferential zone and a radial circumferential zone extending radially inward, and said axial end of the socket can be mounted radially inside and in contact with said axial zone, said annular groove comprising two circumferential and radial side walls respectively formed by said step and by said radial zone.

According to another general aspect of the invention, the device incorporates a pipe, which preferably has a corrugated radially outer face, said protuberance having a radial protuberance height that exceeds said radial step height and that is substantially equal to that of the pipe, which is mounted axially against said protuberance.

A production method according to the invention for a coupling device as defined above comprises the following steps:

a) placing, around the socket, a blank of the sleeve with a base of a plastic or a composite material with a plastic matrix that is injection molded, in order for said axial end of the socket to be jammed in said radially inner part of the sleeve, which extends axially by an axial annular protrusion of said blank across from said tubular portion of the socket, then b) heating and hot plastic deformation, preferably by heading, of said axial annular protrusion to transform it into said protuberance of the sleeve.

Typically, "heading" refers to a technique used to create a mechanical connection between several parts by partial deformation of a part made from a plastic material implemented by upsetting this material.

Advantageously, it is possible to implement the heating and plastic deformation in step b) using an ultrasound generator associated with a sonotrode returning the vibrational energy from the generated ultrasounds to said axial annular protrusion.

Alternatively, it is possible to carry out the heating in step b) using a technique chosen from the group made up of rotational friction, vibrational friction, an electrically heated mirror, hot air blast, infrared radiation and laser radiation.

BRIEF DESCRIPTION OF THE DRAWINGS

Other features, advantages and details of the present invention will emerge from reading the following description of several example embodiments of the invention, provided as an illustration and non-limitingly, the description being done in reference to the attached drawings, in which:

FIG. 3 is a partial axial half-sectional schematic view of a coupling device according to one example of the invention, comprising the sleeve mounted on the socket and obtained by plastic deformation of this blank, FIG. 4 is a partial perspective schematic view of the device of FIG. 3.

DETAILED DESCRIPTION

In the present description, the expressions "in front of" or "front" refer to relative positions along the axis of symmetry X of the male endpiece, the socket, the sleeve and the pipe, which are turned toward the side of the insertion direction of the male endpiece (i.e., toward the locking member), and "behind" or "rear" refer to relative positions along the axis X turned away from this direction (i.e., the side of the pipe).

Figure 1:
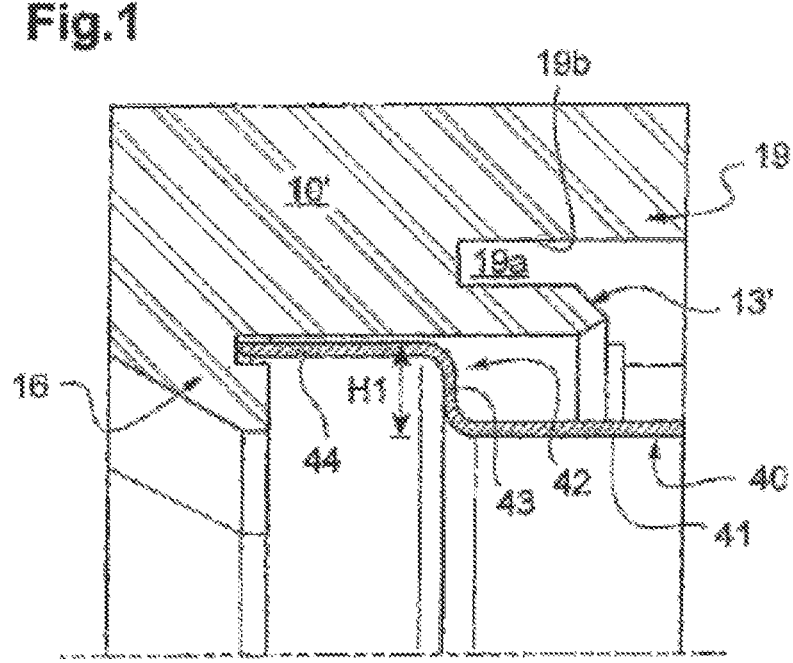
FIG. 1 is a partial axial half-sectional schematic view of a sleeve blank according to the invention inside which a socket is mounted, in order to form a coupling device according to the invention after deformation of the blank.
Figure 2:
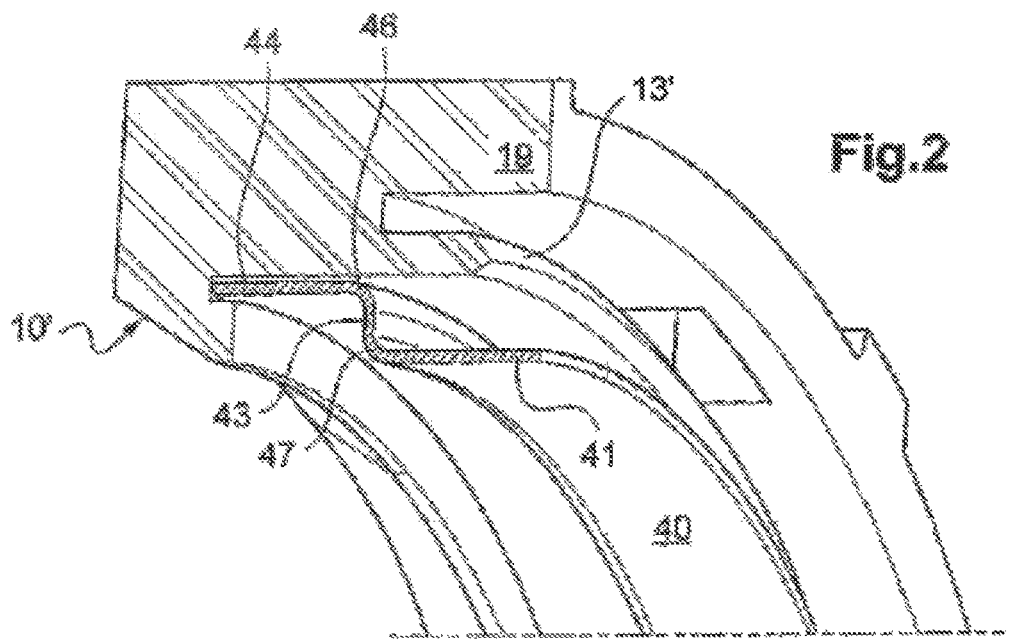
FIG. 2 is a partial perspective schematic view of the sleeve blank of FIG. 1 mounted on this socket.
Figure 5:
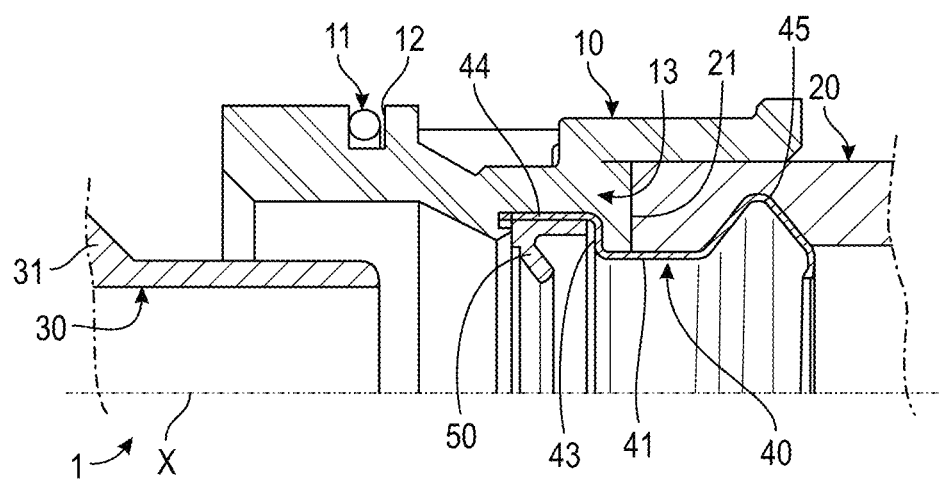
FIG. 5 is a partially exploded axial half-sectional schematic view of a coupling device according to another example of the invention, further showing the male endpiece to be inserted, the member for locking the sleeve on this male endpiece, a lip seal and the pipe mounted on a socket with a bulge obtained by rolling.
Figure 6:
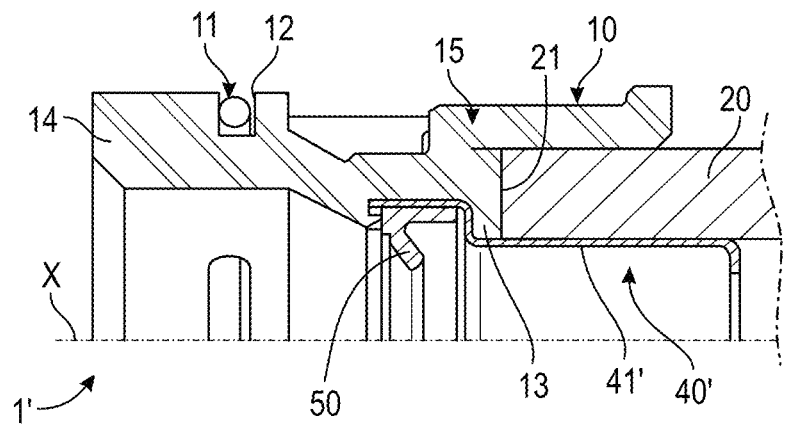
FIG. 6 is an axial half-sectional schematic view of the device of FIG. 5, showing the locking member of the sleeve, this lip seal and this pipe mounted on the socket before rolling.
Figure 7:
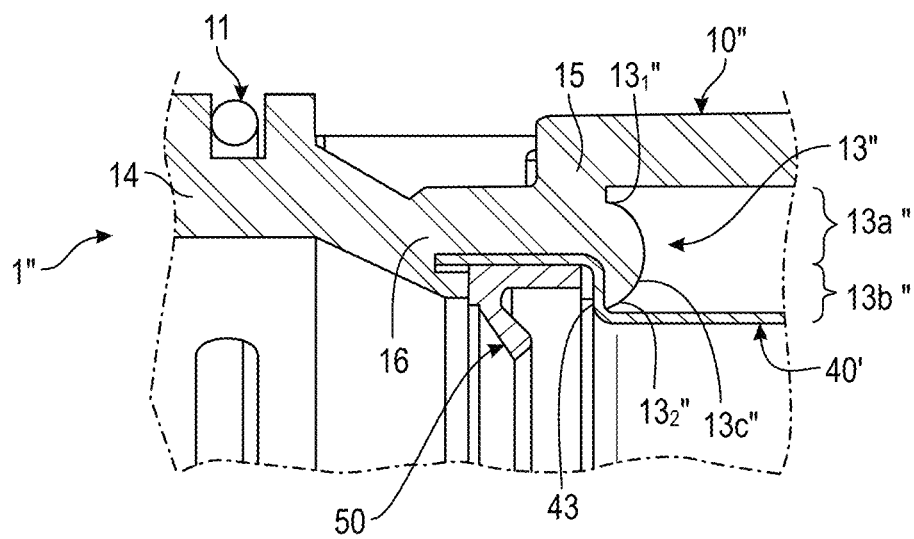
FIG. 7 is an axial half-sectional schematic view of another device according to the invention, corresponding to an alternative of FIG. 6 showing another sleeve equipped with the locking member and mounted on the same socket containing this lip seal before rolling.

The coupling device 1, 1', 1" according to the invention and illustrated in FIGS. 5, 6 and 7 essentially comprises:
  a tubular sleeve 10, 10" with a base of a plastic or a composite material with a plastic matrix gripping a flexible pipe 20 and axially locking a rigid male endpiece 30 (partially visible in FIG. 5) using a U-shaped locking pin 11 mounted through the sleeve 10, 10" and which cooperates with a peripheral protrusion 31 of the male endpiece 30 (the pin 11 in this example includes two elastic locking wings joined by a gripping head pushed transversely and reversibly through a pair of apertures 12 formed in front of the sleeve 10, 10" to be blocked by snapping in a locked position against the protrusion 31 and following the complete insertion of the male endpiece 30),
  a metal socket 40, 40' comprising a tubular portion 41, 41' intended to be gripped by the pipe 20 and ending with a collar 42 formed by a radial step 43 extended by a circumferential axial end 44 of the socket 40 (the collar 42 and the end 44 of the socket 40 are more clearly shown in FIGS. 1-4),
  a sealing lining 50 preferably made from rubber that is housed in an annular groove 51 formed radially inside the collar 42 and is mounted bearing on the endpiece 30, the lining 50 being formed in the illustrated example by a lip seal, and
  means 13, 13" for mechanical assembly of the sleeve 10, 10" to the socket 40, 40' that are formed in a plane transverse to the sleeve 10, 10" and the socket 40 and that are mounted bearing axially behind and against the step 43.

According to the invention, these assembly means 13, 13" are part of the sleeve 10, 10", with which they are formed in a single piece, and are made up of an annular protuberance 13, 13" that protrudes in a radially oblong manner (in the example of FIGS. 3-6 for the protuberance 13) or profiled manner (in the example of FIG. 7 for the protuberance 13") while marrying the contour of the majority of the step 43 and, in the illustrated examples, the entire radial height H1 of this step 43.

More specifically, the sleeve 10, 10", which is advantageously injection molded, in the example of FIGS. 1-7 has a front portion 14 that is traversed by the locking pin 11, and a rear portion 15 that surrounds the socket 40, 40' while including the protuberance 13, 13" and that comprises a radially inner part 16 around the sealing lining 50. As illustrated in FIGS. 1 to 4, the radially inner part 16 has, in the rear, an axial circumferential zone 17 extended in the front and radially inward by a radial circumferential zone 18.

FIGS. 1 to 4 show that the axial end 44 of the socket 40 is gripped both by the axial zone 17 and the radial zone 18 of the sleeve 10 so as to be jammed in the rear portion 15. In the example of FIG. 5, its tubular portion 41 has a circumferential bulge 45 obtained by rolling that the pipe 20 grips with deformation of its inner face upon mounting. In the illustrated examples, the step 43 is connected to the axial end 44 by a first rounded transition 46 and to the tubular portion 41 by a second rounded transition 47.

The groove 51 receiving the lining 50 is obtained by a combination of the sleeve 10 and the socket 40, and it comprises:
  two circumferential and radial groove side walls, front and rear, respectively, with the front wall that is formed by the radial zone 18 of the sleeve 10 and the rear wall by the step 43, and
  a circumferential groove bottom that is formed by the axial end 44 of the socket 40.

As illustrated in FIGS. 1-4, the annular radial protuberance 13 is obtained by hot plastic deformation of an axial annular protrusion 13' included by a blank 10' of the sleeve 10 at the radially inner part 16 of the latter, across from the tubular portion 41 of the socket 40. In the example of these figures, the axial annular protrusion 13' has, in axial section, a pointed free end and is separated from a radially outer part 19 of the sleeve 10 by an annular axial recess 19a, the radially outer axial edge of which is extended by a circumferential axial face 19b. The radially outer part 19 is situated across from the tubular portion 41 and is intended to grip the pipe 20.

This plastic deformation of the axial protrusion 13' is done by heading, for example by the action of a sonotrode installed on an ultrasound generating system positioned in the immediate vicinity of the protrusion 13'. Following this heading, the oblong protuberance 13 is obtained in the form of a truncated rectangle with two front and rear large radial sides and two small axial sides connected by two rounded connecting zones forming a radially outer edge $13_1$ and a radially inner edge $13_2$, both convex (i.e., with a section substantially in the shape of an arc of circle) for the protuberance 13. As shown in FIGS. 3-4, this heading transforms the axial protrusion 13' into the protuberance 13 by axially flattening it and radially widening it, which results in causing the recess 19a to disappear.

FIGS. 3-4 show that the protuberance 13 thus obtained comprises:
  a radially outer portion 13a extending radially outward from the axial end 44 of the socket 40 up to the outer edge 13₁ that is mounted in contact with the axial face 19*b* of the radially outer part 19, and a radially inner part 13*b* with a radial height substantially equal to that of the outer portion 13*a* extending radially toward the inside of this axial end 44 to the inner edge 13₂ that is mounted in contact with both the step 43 and the tubular portion 41.

It will thus be understood that the protuberance 13 has a total radial height H2 significantly larger than the radial height H1 of the step 43, and which, in the illustrated example, is more than twice the latter (H2>2.H1).

FIGS. 5 and 6 show that the inner end 21 of the pipe 20 is advantageously mounted axially abutting against the rear face of the protuberance 13 following the crimping of the pipe 20, said protuberance 13 thus being axially jammed between and in contact with the step 43 in front and the pipe 20 in back, over the entire radial height of the protuberance H2 and the pipe 20.

The device 1" illustrated in FIG. 7 differs from that of FIG. 6 only in that the protuberance 13" of the sleeve 10" that it comprises has a rear face 13*c*" that is not straight in axial section (unlike the radial rear face of the protuberance 13), but is convex with an arc of circle shape, between a radially outer edge 13₁" of the radially outer portion 13*a*" and a radially inner edge 13₂" of the radially inner portion 13*b*" of the protuberance 13". The latter thus has a profiled axial section, i.e., characterized by an axial width that decreases radially toward the inside in contact with the step 43 and that gives the protuberance 13" a claw-shaped axial section with a straight front face in the radial direction and with a rounded rear face.

In reference to the example embodiments of the invention described above, it will be noted that the sealing lining 50 can be attached freely or can be secured to the socket 40, 40', for example by overmolding.

The invention claimed is:

1. A coupling device suitable for connecting a rigid male endpiece to a flexible female pipe, the device comprising:
   a sleeve suitable for gripping the pipe and axially locking the endpiece, the sleeve having a radially inner part configured to surround at least one annular seal, said at least one annular seal being configured to bear on the endpiece,
   a socket comprising a tubular portion which is configured to be gripped by the pipe and which includes a collar at one of its ends, said collar comprising a radial step and a tubular axial end portion, said radial step having a radial step height and that extending radially from said tubular portion to said tubular axial end portion, said tubular axial end portion being mounted radially inside said radially inner part and comprising a cylindrical outer surface in contact with said radially inner part, said tubular axial end portion further including a cylindrical inner surface forming a bottom of an annular groove, said at least one annular seal comprising a cylindrical outer surface in contact with said radially inner part, said tubular axial end portion further including a cylindrical inner surface,
   an assembly that is configured to mechanically assemble the sleeve to said collar, the assembly comprising a continuous circumferential protuberance formed in a single piece with the sleeve,
   wherein said protuberance protrudes inwardly from said radially inner part so as to bear against said radial step, over a majority of said radial step height.

2. The coupling device according to claim 1, wherein said protuberance extends radially elongated and inwardly from said radially inner part of the sleeve, over substantially all of said radial step height.

3. The coupling device according to claim 1, wherein said protuberance extends over all of said radial step height and has, in axial section, an oblong or profiled geometry that is radially elongated and that ends with a radially inner rim bearing against said tubular portion of the socket.

4. The coupling device according to claim 3, wherein said geometry is oblong and substantially in a shape of a truncated rectangle that has two radial large sides and two axial and rounded small sides.

5. The coupling device according to claim 3, wherein said geometry is profiled with an axial width that decreases radially inward over said radial step height, said protuberance having a convex outer contour with an axial section substantially in the shape of an arc of circle.

6. The coupling device according to claim 1, wherein said protuberance comprises:
   a radially outer portion extending radially toward the outside of said axial end of the socket up to a radially outer edge of said protuberance, and
   a radially inner portion extending radially toward the inside of said axial end of the socket up to a radially inner edge of said protuberance.

7. The coupling device according to claim 6, wherein the sleeve has a radially outer part that is situated across from said tubular portion of the socket and that is intended to surround said pipe, said protuberance extending protruding radially outward up to said radially outer edge, which is substantially mounted in contact with said radially outer part.

8. The coupling device according to claim 7, wherein said radially inner edge and said radially outer edge of said protuberance have a convex shape.

9. The coupling device according to claim 1, wherein the sleeve has a base of a plastic or a composite material with a plastic matrix that is injection molded.

10. The coupling device according to claim 9, wherein the sleeve said protuberance is obtained by hot plastic deformation of an axial annular protrusion that said radially inner part of the sleeve initially has in place of said protuberance, across from said tubular portion of the socket.

11. The coupling device according to claim 1, wherein for the socket, said radial step is connected to said tubular axial end portion by a first rounded transition and to said tubular portion by a second rounded transition.

12. The coupling device according to claim 1, wherein said radially inner part of the sleeve can have an axial circumferential zone and a radial circumferential zone extending it radially inward, and said tubular axial end of the socket is mounted radially inside and in contact with said axial zone, said annular groove comprising two circumferential and radial side walls respectively formed by said radial step and by said radial zone.

13. The coupling device according to claim 1, wherein said tubular portion of the socket has at least one circumferential bulge obtained by rolling and suitable for cooperating with an inner face of said pipe intended to be gripped by the sleeve.

14. The coupling device according to claim 1, wherein the device incorporates said at least one annular seal and includes an O-ring or a lip seal.

15. The coupling device according to claim 1, wherein the device incorporates said pipe, said protuberance having a radial protuberance height that exceeds said radial step height and that is substantially equal to that of the pipe, which is mounted axially against said protuberance.

16. A method for producing a device according to claim 1, wherein the method comprises the following steps:
   a) placing, around the socket, a blank of the sleeve with a base of a plastic or a composite material with a plastic matrix that is injection molded, in order for said tubular axial end portion of the socket to be jammed in said radially inner part of the sleeve, which extends axially by an axial annular protrusion of said blank across from said tubular portion of the socket, then
   b) heating and hot plastic deformation of said axial annular protrusion to transform it into said protuberance of the sleeve.

17. The method according to claim 16, wherein the heating and plastic deformation are implemented in step b) using an ultrasound generator associated with a sonotrode returning the vibrational energy from the generated ultrasounds to said axial annular protrusion.

18. The method according to claim 16, wherein the heating is implemented in step b) using a technique chosen from the group made up of rotational friction, vibrational friction, an electrically heated mirror, hot air blast, infrared radiation and laser radiation.

* * * * *